United States Patent [19]

Swanson

[11] 4,314,549

[45] Feb. 9, 1982

[54] OMNIDIRECTIONAL SOLAR COLLECTOR

[76] Inventor: William A. Swanson, 2485 S. W. Elmhurst, Beaverton, Oreg. 97005

[21] Appl. No.: 42,703

[22] Filed: May 25, 1979

[51] Int. Cl.³ .............................................. F24J 3/02
[52] U.S. Cl. .................................. 126/449; 126/417; 126/441; 126/450
[58] Field of Search ............... 126/449, 450, 417, 441, 126/432, 429, 428, 448, 446

[56] References Cited

U.S. PATENT DOCUMENTS

| | | | |
|---|---|---|---|
| 3,939,818 | 2/1976 | Hamilton et al. | 126/432 |
| 4,038,969 | 8/1977 | Smith | 126/448 |
| 4,088,115 | 5/1978 | Powell | 126/432 |
| 4,111,183 | 9/1978 | Haberthier | 126/429 |

FOREIGN PATENT DOCUMENTS 2388220 4/1977 France ............................. 126/449

Primary Examiner—Larry Jones

[57] ABSTRACT

A solar energy black body collector is disclosed that gathers the sun's radiant forms of energy, transforms the energy to heat energy and transfers this energy to a medium fluid (air). The energy absorbing structure consists of a cell layer (secondary black body collector) and a flat plate (primary black body collector) almost perpendicular to each other. This combined structure collects the sun's rays from any inbound angle and reduces, to a minimum, reflected rays out of the black body collector frontal area.

The black body collector structure is mounted between a transparent (to light wave energy) front panel and an opaque rear panel. The entire unit is hermetically sealed to the outside elements and is a completed unit ready for service.

5 Claims, 3 Drawing Figures

OMNIDIRECTIONAL SOLAR COLLECTOR

BACKGROUND OF THE INVENTION

In the search for methods of utilizing the sun's energy, a wide variety of solar collectors have been developed, including electrical conversion collectors, passive thermal collectors such as a dark-colored interior rock wall behind a pane of glass, concentrating thermal collectors utilizing either a double convex lens or a parabolic mirror to either refract or reflect direct radiation to a specific point, and flat plate thermal collectors.

Because of the many practical problems associated with the others, most research has been devoted to the flat plate thermal collector, which is available in a variety of designs. The essential components of a flat plate collector are a transparent sheet such as glass or plastic, commonly referred to as glazing, which allows shortwave radiation from the sun to pass but is impervious to longwave radiation, a dark-colored, generally opaque energy-absorbing surface to absorb the shortwave solar radiation and convert it to longwave radiation, and a convection heat transfer medium, such as air or water.

The principal drawback of most prior art flat plate collectors has been that they are not efficient at capturing two of the three available types of usable light energy, i.e., indirect and diffuse radiation, and lose substantial amounts of the third type of light energy, i.e., direct radiation, when the angle of light incidence is fairly large, as in the early morning or late afternoon. Such losses occur both through reflection from the planar energy-absorbing surface and as a result of a decrease in the effective area of exposure whenever the angle of incidence of the impinging light is great. Still another drawback of flat plate collectors is the requirement that they be substantial in size and installed south to southwest at an angle equal to the sum of the latitude of its location plus 15° in order to accomplish maximum collection of thermal energy, necessitating expensive structural support.

One prior art improvement on the flat plate collector has featured the use of perpendicular vanes in connection with the energy-absorbing surface, accomplished by the use of either a large number of aluminum cups or L-shaped plates supported upon a planar surface and closed at their bases, as set forth in U.S. Pat. Nos. 3,894,685, 3,946,720, 3,946,721 and 4,088,266. While improved flat plate collectors of this type are effective to obviate many of the energy-collecting deficiencies of other flat plate collectors described in the previous paragraph, they do little to enhance, and may even diminish, the convection heat transfer characteristics of the collector. Since the heat transfer efficiency is as important as the energy-collecting efficiency of a flat plate collector, enhancing one without also enhancing the other is self-defeating. Thus, in the case of a collector wherein the collecting efficiency is enhanced by the use of cups closed at their bases, and particularly where the base closure constitutes the energy-absorbing surface, the impediment to flow of the convection medium, such as air, over the interior surfaces of the cups, and over the primary energy-absorbing surface, tends to inhibit rather than enhance the transfer of heat from the surfaces to the convection medium.

Accordingly, what is needed is a flat plate collector which is more efficient at capturing and collecting all three types of usable light energy while, at the same time, having correspondingly enhanced efficiency with respect to the transfer of heat by convection. It would also be desirable if such enhanced heat transfer efficiency could be obtained without requiring forced convection, such as by the use of a fan, since such forced convection systems themselves use significant amounts of energy.

SUMMARY OF THE INVENTION

It is a primary object of the present invention to provide a new and improved solar energy collector.

Another object of this invention is to provide a fixed plate thermal collector with greatly improved collection capacity and efficiency and correspondingly improved convection heat transfer capacity and efficiency.

A further object is to provide an omnidirectional solar collector that absorbs direct, indirect and diffuse solar radiation even at relatively large angles of radiation incidence, that transfers thermal energy extremely efficiently by convection, that is relatively small and need not be supported at any predetermined angle, having the capability of being merely hung from an existing exterior wall, and which is very inexpensive.

These and other objects are accomplished by the provision of a layer of open cells between the transparent sheet and the energy-absorbing surface of a conventional flat plate collector with an air space provided both above and below the layer of cells.

The layer of open cells is formed from an energy-absorbing material, with the walls of the cells oriented generally perpendicular to the plane of the conventional energy-absorbing surface and being open at both ends so as to allow direct solar radiation to pass through the cell layer directly to the planar energy-absorbing surface below while also allowing free air flow from one side of the cell layer to the other side. The cells themselves may be of any suitable geometric configuration in cross section, although a circular cross section is preferred. The height of the cell walls should be such as to allow passage of radiation having an angle of incidence of from 0° to about 70°, depending upon site latitude, to pass through to the principal or primary energy-absorbing surface. In other words, if it is desired to maximize collection of thermal energy in the early morning and late afternoon, the height of the cell wall should be larger up to a maximum height equal to the diameter of the cell in cross section; conversely, if maximization of collection during mid morning to mid afternoon is desired, the height of the cell wall should be smaller down to a minimum that will allow passage of radiation having an angle of incidence of about 70°.

The energy-absorbing material forming the layer of cells may be virtually any material capable of converting shortwave solar radiation to longwave radiation. Materials of this sort are black-painted, graphite-coated or selective surface-coated aluminum, copper, nickel, silver, zinc or steel, certain thermal plastics, glass and black gauze. Preferably, due to its low cost, black-painted glass is used.

The omnidirectional collector of the present invention need not be installed facing due south nor at an angle equal to the sum of the latitude of its location plus 15°; it may be attached to any existing exterior wall generally perpendicular to the ground and, in the northern hemisphere, facing in a generally southerly to southwesterly direction. It is also advantageously used with a reflector, which should be at the bottom, in front of and generally horizontally at right angles to the collector, although the reflector may also be at an angle which corresponds to the angle of the sun at its lowest point in the day.

In operation the open cells allow passage of solar radiation, having angles of incidence of from about 0° to about 70° depending upon site latitude, through to the generally planar, energy-absorbing surface beneath which functions as a primary collector. Concurrently, the layer of cells functions as a secondary collector, absorbing direct radiation reflected from the primary collector, and direct, indirect and diffuse radiation from outside the omnidirectional collector having angles of incidence of from about 1° to about 89°, thereby recovering a substantial part of the radiation not captured by a conventional flat plate collector and accounting for a significant decrease in thermal energy loss through convection and radiation. At the same time the provision of an air space above and below the layers of cells, and the open-ended construction of the cells at both ends with a cold air intake at one end and a hot air exhaust at the other end, creates a highly efficient natural convection system with low speed, high pressure air on one side of the layer of cells and high speed, low pressure air on the other side, the layer of cells doubling as an air-flow baffle permitting free flow of air therethrough over the large surface area created by the cells. The convection system thus created is capable of rapidly sweeping the energy-rich heat transfer medium (hot air) from the collector with no auxiliary energy required, such as would be the case as with the use of a fan or heat pump. This natural convection could be enhanced of course by the use of either a fan or heat pump, which is optional.

DETAILED DESCRIPTION OF INVENTION

Figure 1:
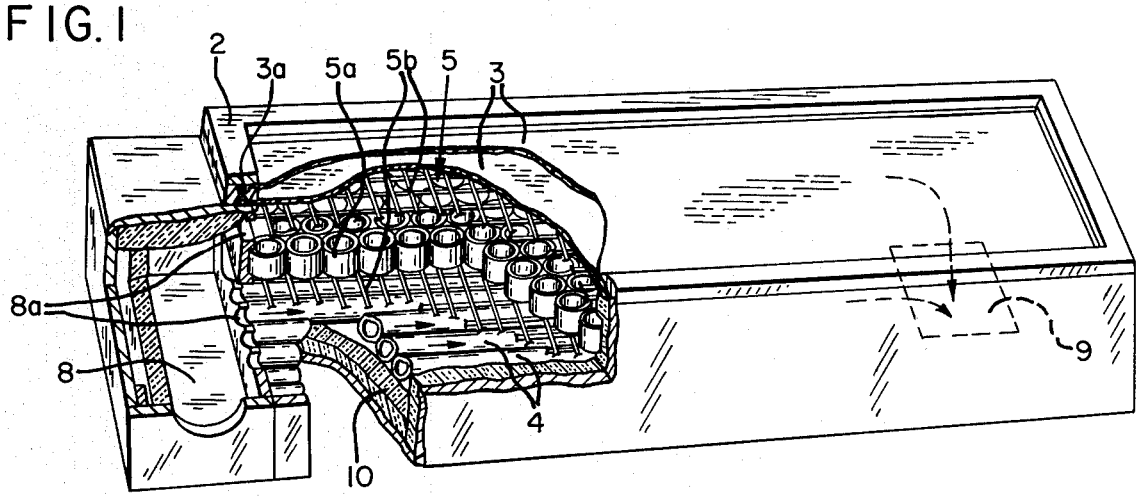
FIG. 1 is a perspective view of one embodiment of the omnidirectional solar collector of the present invention, with portions broken away to show inner structure.

Referring to the drawings where like numerals correspond to like parts, the omnidirectional solar collector of the present invention is indicated generally by the numeral 1 and comprises an open box-shaped housing structure 2, a transparent sheet or glazing 3, a conventional dark-colored generally opaque energy-absorbing surface 4, which will hereafter be referred to as the primary collector, a cell layer 5, which will hereafter be referred to as the secondary collector, air spaces 6 and 7 above and below the secondary collector, a cold air intake 8, a hot air exhaust 9 and insulation 10.

The shape of the housing structure 2 is not critical, and any desired shape will do so long as it provides structural support for the various components of the present invention.

The transparent sheet or cover 3 is preferably glass, although any material will suffice that is capable of transmitting shortwave solar radiation and impervious to longwave solar radiation. Another known suitable material is Tedlar ®, a translucent plastic material manufactured by DuPont. The embodiment shown in FIGS. 1 and 2 comprises two sheets of Tedlar ® with an air space between, stretched across the top of the housing structure and being supported by dowels 3a at either end.

The primary collector 4 shown in the drawings is preferably constructed of long hollow glass tubes from fluorescent light tube extrusions, the outsides of which have been painted flat black and set into corresponding notches 2a in the walls of the housing 2. However, any known flat or fixed-plate collector will be equally usable as the primary collector in the present invention.

Figure 2:
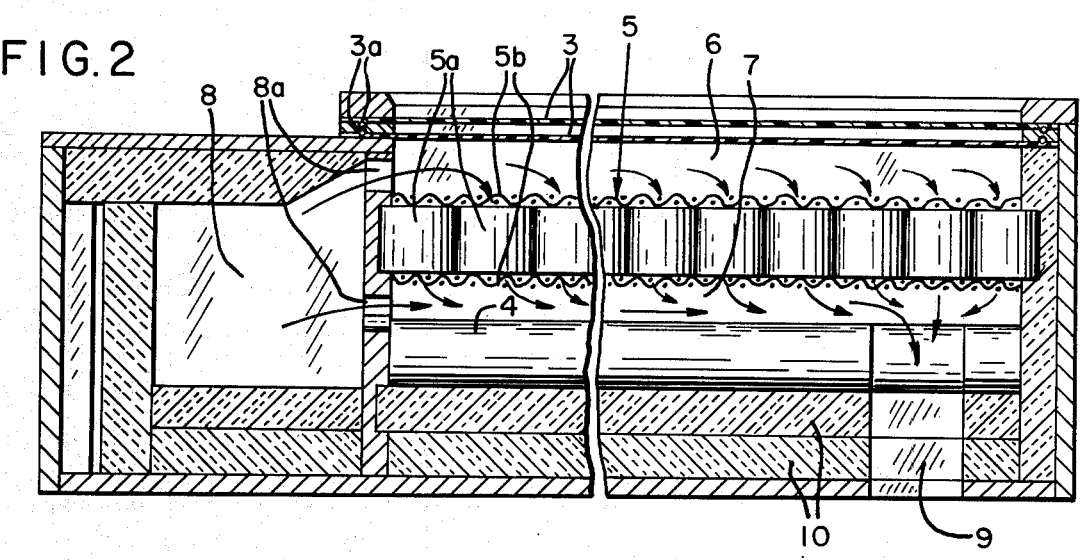
FIG. 2 is an extended cross-sectional view of the omnidirectional solar collector of FIG. 1.

The open cell layer 5, best shown in FIGS. 1 and 2, is shown in the preferred embodiment as being comprised of a multitude of individual, open-ended, short right cylinder cells 5a supported between air-pervious, open grids 5b, the walls of the cylinders being substantially perpendicular to the plane defined by the perimeter of the primary collector 4. Although not shown in the drawings, the entire cell layer may be canted at a slight angle from front exhaust to rear exhaust (the right end being slightly higher than the left end shown in FIG. 2), so as to improve convection flow in the collector. Each right angle cylinder cell may be constructed from short lengths of fluorescent light tube extrusions painted flat black on both the inside and outside. Preferably, at a latitude of 45°, each cell has a height equal approximately to its diameter, although variation of height is permissable so long as it does not unduly interfere with absorption of radiation by the primary collector, allowing substantially all direct solar radiation with an angle of incidence of from about 0° to about 45° to pass through the secondary collector to the primary collector. The geometric configuration of each individual cell may be any open-ended configuration, although regular geometric shapes are preferred for maximization of surface area, for uniformity in allowing passage of radiation to the primary collector, and for uniformity in absorption of that radiation which is not absorbed by the primary collector. Although the cell layer 5 is shown as being coextensive with the transparent cover 3 and the primary collector 4, it need not be, the only limitation being the degree of efficiency desired, bearing in mind that the greater the surface area, the greater the thermal collection capacity.

The air spaces 6 and 7, seen best in FIG. 2, form part of the natural convection system of the present invention, cooperating with the cold air intake 8, the hot air exhaust outlet 9 and the cell layer 5, the cell layer also functioning as an air-flow baffle. The air spaces should be of such dimensions and configuration as to allow the unrestricted passage of air therethrough.

In the operation of the embodiment of FIGS. 1 and 2, cold air enters the omnidirectional solar collector at 8 and moves through apertures 8a and through the air spaces 6 and 7 both above (or in front) and below (or behind) the cell layer 5. The location of the exhaust outlet 9 in proximity to the air space 7 and separated from the air space 6 by the cell layer 5 (which acts as an air flow restrictor baffle), causes the air to flow at relatively low speed and high pressure in air space 6 and at relatively high speed and low pressure in air space 7, the air in air space 6 thus moving through the open-ended cells to the low pressure area created in air space 7, and then out the hot air exhaust outlet 9, all as indicated by the arrows in FIG. 2. No fan or blower of any sort is necessary with this arrangement, although either may be used to enhance the movement of hot air through the system. In order to preserve thermal energy, insulation 10 may be provided as shown generally in FIGS. 1 and 2.

Figure 3:
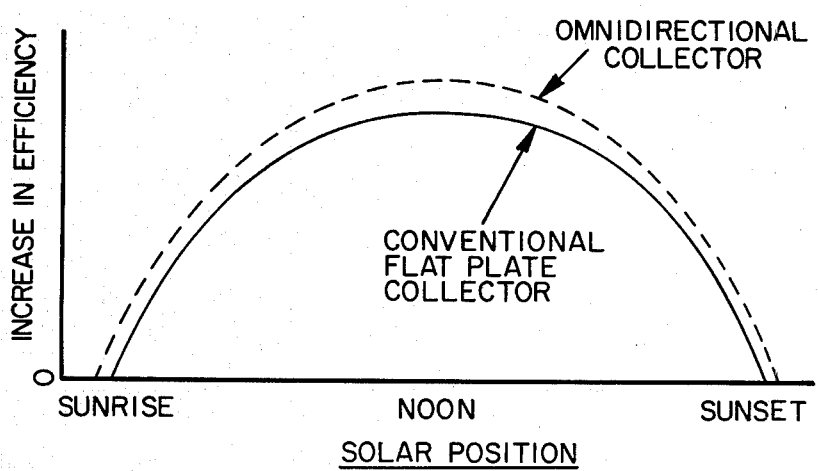
FIG. 3 is a schematic graph showing comparative theoretical thermal efficiencies of a conventional flat plate solar collector and of the omnidirectional solar collector of the present invention.

FIG. 3 shows a schematic plot comparing the relative theoretical efficiencies of a conventional flat plate solar collector with the omnidirectional solar collector of the present invention. As shown, the efficiency of a conventional flat plate solar collector peaks at noon, the point at which the sun is the highest in the sky and thus emits the greatest amount of direct radiation, dropping off in efficiency to zero near sunrise and sunset. By comparison, the overal efficiency of the omnidirectional collector shows an average increase from about 5% to about 15% through the solar day.

Because the omnidirectional solar collector of the present invention is relatively independent of direct solar radiation, it need not be installed facing due south, nor at an angle equal to the traditional latitude of location plus 15°%. Thus, no additional expensive structure is required as in the case of a conventional flat plate solar collector; the omnidirectional collector may simply be hung from or otherwise supported from an existing exterior wall, tree or other support that faces in a generally southerly to southwesterly direction and is exposed to the sun.

Also due to its great energy collecting area in comparison to its physical size, and the fact that such area is effectively utilized both for collection and for heat transfer by convection due to the arrangement of open-ended cells and cooperating air spaces on both sides of the cell layer, the omnidirectional solar collector of the present invention requires less physical space than a conventional flat plate collector providing an equivalent daily energy output, obviating any requirement for either a large open area or substantial support.

The nature, scope, utility, and effectiveness of the present invention have been described and specifically exemplified in the foregoing specification. The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:
1. An omnidirectional solar collector comprising
   (a) a transparent sheet pervious to shortwave solar radiation but impervious to longwave radiation,
   (b) a primary collector comprising a plurality of parallel tubes, including a means on the surface for absorbing shortwave solar radiation and re-radiating the same as longwave radiation, and
   (c) a secondary collector comprising a layer of cells situated between said transparent sheet and said primary collector with respective air spaces on either side of said layer of cells, a first one of said air spaces separating said cell layer from said primary collector, cell walls in said cell layer being oriented generally perpendicular to the surface of said primary collector and being open to both sides of said layer so that the interior of each cell is exposed to both of said first and second air spaces, said cell walls including means absorbing shortwave solar radiation and re-radiating the same as longwave radiation.

2. The solar collector of claim 1 wherein the cells of said cell layer are in the shape of right cylinders open at both ends.

3. The solar collector of claim 1 wherein the transparent sheet, the primary collector and the secondary collector are supported in a housing structure, the housing structure having a cold air intake and a hot air exhaust in communication with said air spaces.

4. The solar collector of claim 3 wherein said layer of cells is interposed between said first air space and said hot air exhaust.

5. The solar collector of claim 4 wherein the communication between said cold air intake and said first and second air spaces is free of any interposition of said layer of cells.

* * * * *